United States Patent
Kim et al.

(10) Patent No.: US 7,286,826 B2
(45) Date of Patent: Oct. 23, 2007

(54) METHOD FOR PROVIDING A MULTICAST SERVICE USING A CARRIER-TO-INTERFERENCE RATIO IN A HIERARCHICAL CELL STRUCTURE

(75) Inventors: Chang-Young Kim, Seoul (KR); Il Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 10/784,171

(22) Filed: Feb. 24, 2004

(65) Prior Publication Data

US 2004/0166863 A1    Aug. 26, 2004

(30) Foreign Application Priority Data

Feb. 25, 2003    (KR)    ........................ 10-2003-0011675

(51) Int. Cl.
    *H04Q 7/20*    (2006.01)
(52) U.S. Cl. .................. 455/444; 455/440; 455/449; 455/226.3; 370/332; 370/333; 370/331
(58) Field of Classification Search ............... 455/440, 455/441, 442, 443, 444, 448–450, 453, 436, 455/455, 63.1, 67.13, 226.3, 452.2; 370/331, 370/332, 333
See application file for complete search history.

(56) References Cited

U.S. PATENT DOCUMENTS

| | | | |
|---|---|---|---|
| 6,205,336 B1 | 3/2001 | Ostrup et al. | |
| 6,212,389 B1 * | 4/2001 | Fapojuwo | 455/453 |
| 6,256,500 B1 * | 7/2001 | Yamashita | 455/441 |
| 6,484,030 B1 | 11/2002 | Antoine et al. | 455/444 |
| 6,873,847 B2 * | 3/2005 | Shimono et al. | 455/441 |
| 2001/0017851 A1 * | 8/2001 | Yamaguchi et al. | 370/332 |
| 2002/0009998 A1 | 1/2002 | Reemtsma | 455/449 |
| 2003/0054807 A1 * | 3/2003 | Hsu et al. | 455/414 |

FOREIGN PATENT DOCUMENTS

| | | |
|---|---|---|
| EP | 0562743 | 9/1993 |
| GB | 2301733 | 12/1996 |
| GB | 2357224 | 6/2001 |

(Continued)

*Primary Examiner*—Duc M. Nguyen
*Assistant Examiner*—Anthony S. Addy
(74) *Attorney, Agent, or Firm*—Roylance, Abrams, Berdo & Goodman, L.L.P.

(57) ABSTRACT

A method for providing a multicast service from a macrocell or a microcell to a mobile station in a mobile communication system having a hierarchical cell structure in which a given area is divided into at least one macrocell and at least one microcell overlapping with each other. The mobile station receives a multicast service by accessing the macrocell or the microcell according to a carrier-to-interference ratio (C/I) for the multicast service measured in a macrocell area and according to an existence or non-existence of a concurrent call currently in service. When there is no concurrent call currently in service, the mobile station receives the multicast service by accessing the macrocell in an area where the measured C/I is equal to or greater than a required C/I. However, when there is a concurrent call currently in service, the mobile station receives the multicast service by accessing the macrocell or the microcell based on the current cell and the C/I.

9 Claims, 4 Drawing Sheets

FOREIGN PATENT DOCUMENTS

| | | |
|---|---|---|
| GB | 2359452 | 8/2001 |
| GB | 2390953 | 1/2004 |
| JP | 2002-204470 | 7/2002 |
| JP | 2002-523937 | 7/2002 |
| JP | 2004-254304 | 9/2004 |
| KR | 2001-661572 | 7/2001 |
| WO | WO 00/10355 | 2/2000 |

* cited by examiner

METHOD FOR PROVIDING A MULTICAST SERVICE USING A CARRIER-TO-INTERFERENCE RATIO IN A HIERARCHICAL CELL STRUCTURE

PRIORITY

This application claims priority under 35 U.S.C. § 119 to an application entitled "Method for Providing Multicast Service Using Carrier-to-Interference Ratio in Hierarchical Cell Structure" filed in the Korean Intellectual Property Office on Feb. 25, 2003 and assigned Serial No. 2003-11675, the contents of which are incorporated herein by reference.

BACKGROUND OF THE INVENTION

1. Field of the Invention

The present invention relates generally to a mobile communication system, and in particular, to a method for efficiently providing a multicast service in a hierarchical cell structure.

2. Description of the Related Art

In a mobile communication system, various wireless accesses to, for example, a megacell, a macrocell, a microcell and a picocell can be made according to a service range and a data rate defined in International Telecommunication Union-Telecommunication Standardization Sector (ITU-T) Q.1711, and service coverage is different according to the type of the cells. Also, the service coverage and a data rate can be different to some extent according to a class of a mobile communication service a service method for each of the cells will be described below by way of example.

The megacell provides a wideband service that covers a wide area using a satellite communication network, and its cell radius is less than 100 to 500 Km. The megacell can simultaneously provide a data service and a voice service. The macrocell has a service radius less than 35 Km, and is mainly used in the suburbs and a semi-flat area to expand its coverage in a low-traffic area in a mobile communication system. The macrocell can be introduced regardless of the frequencies between a base station for cell expansion and a base station installed as a repeater.

Meanwhile, the microcell has coverage of about 0.5 to 1 Km, and in the microcell, a visible-range radio path where a mobile station can see a base station's antenna becomes a main transmission path. In addition, the picocell services a building-crowded area and an underground area with a radius of less than 50 m in the downtown area by installing an in-building system or a small repeater. The in-building system provides an in-building service by connecting a European Transmission Rate 1 (E1) line from a mobile switching center to an in-building Base station Transceiver System (BTS), i.e., a pico-BTS, and installing an optical cable and an antenna in the building, and the small repeater receives a ground wave and services a basement of the building using an omni-antenna or a patch antenna at a maximum data rate of 2 Mbps.

In a mobile communication system, a service area and an application area of a cell are different according to the type of service provided, and an arrival distance and subscriber capacity within a cell area are changed according to a position of a base station's antenna, height of the antenna, a beam type of the antenna, an antenna slope, and transmission power of the antenna.

Providing different services according to a scale and data rate of a cell in the same area, as mentioned above, is called a "hierarchical cell structure (HCS)." For example, when a service for a microcell and a service for a macrocell are simultaneously provided in a particular area, it can be considered that the area is forming HCS.

Generally, in the HCS system, the macrocell manages a fast-moving user and a low-speed data transmission service, while the microcell manages a slow-moving user and a high-speed data transmission service. More specifically, since the macrocell has a large cell radius but has a limited service capacity, it is preferable for the macrocell to service a user requiring a low-speed data transmission service. However, when a fast-moving user is serviced in the microcell, service efficiency may be reduced due to frequent handovers (also known as handoff). Therefore, it is preferable that the fast-moving user is serviced in the macrocell rather than the microcell.

In some cases, a method of providing a service can be changed according to a load of the macrocell or the microcell. That is, there is a proposed method for providing a service to a fast-moving user in the macrocell when a particular microcell has a very heavy load.

Meanwhile, regarding a scheme for providing a multicast service in the HCS, there is a possible method for providing the multicast service in a microcell when the number of microcells providing a particular multicast service is very small, and for providing the multicast service in a macrocell when the number of the microcells is large.

However, for the multicast service, when a high-speed data transmission service is provided exclusively by a microcell, quality of service (QoS) may be decreased due to an increase in the number of users receiving a particular multicast service or to frequent handovers. In contrast, when the multicast service is provided exclusively by the macrocell, an increase in a data rate of the multicast service does not affect a load of the macrocell.

In addition, there is provided a scheme for dynamically selecting a layer of a multicast service. However, since handovers may frequently occur between layers during the service, the macrocell may experience considerable capacity reduction due to data being transmitted at high speed.

SUMMARY OF THE INVENTION

It is, therefore, an object of the present invention to provide a method for efficiently providing a multicast service by selecting a macrocell or a microcell using a carrier-to-interference ratio in a hierarchical cell structure in a mobile communication system.

To substantially achieve the above and other objects, a method provides a multicast service from a macrocell or a microcell to a mobile station in a mobile communication system having a hierarchical cell structure in which at least one microcell area overlaps one macrocell area. The method comprises determining whether a measured carrier-to-interference ratio (C/I) in the macrocell where the microcell area overlaps satisfies a required C/I for a specific multicast service; and receiving by the mobile station the specific multicast service from a base station that controls the macrocell, if the measured C/I satisfies the required C/I.

Further, the method comprises the step of determining whether a service that the mobile station wants to receive is a multicast service, when the mobile station enters a given microcell and accesses a base station of the microcell.

If a service that the mobile station wants to receive is not a multicast service, the mobile station maintains an access to a base station of the corresponding microcell.

Even when the measured C/I measured to which the mobile station belongs satisfies the required C/I, the mobile station selectively receives the multicast service from the macrocell and the microcell based on a service state of the microcell to which the mobile station is located.

The mobile station determines whether the multicast service can be provided from the microcell, based on the number of users requesting a specific multicast service.

The mobile station determines whether the multicast service can be provided from the microcell, based on the number of microcells providing a specific multicast service.

When the measured C/I does not satisfy the required C/I, the mobile station maintains an access to a base station of the corresponding microcell.

When the mobile station receives the multicast service from the macrocell, the mobile station measures the C/I in the macrocell area at selected periods, and determines whether the measured C/I for the selected periods satisfies the required C/I, thereby determining whether to perform a handover to the microcell.

When an area of the macrocell is divided according to available data rates and the mobile station enters the divided area of the macrocell, the C/I for a data rate of the corresponding area is applied according to whether a multicast service is provided to the mobile station.

A data rate which becomes a criterion for the area division is one of 384 Kbps, 144 Kbps, 64 Kbps and 12.2 Kbps. In a synchronous Evolution-Data Only (EV-DO) system, the data rate which becomes a criterion for the area division is one of 38.4 Kbps, 76.8 Kbps, 153.6 Kbps and 307.2 Kbps.

To substantially achieve the above and other objects, a method provides a multicast service using a carrier-to-interference ratio (C/I) in a hierarchical cell structure in a mobile communication system in which a given area is divided into at least one macrocell and at least one microcell overlapping with each other and a mobile station receives the multicast service from the macrocell or the microcell. The method comprises transmitting, by a base station controller, a measured C/I in a corresponding macrocell area to the mobile station, when the mobile station enters a given microcell and transmits a multicast packet call setup request to a base station to set up a radio bearer to the base station controller; and performing a handover from the microcell to the macrocell, if the measured C/I satisfies a required C/I for the multicast service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
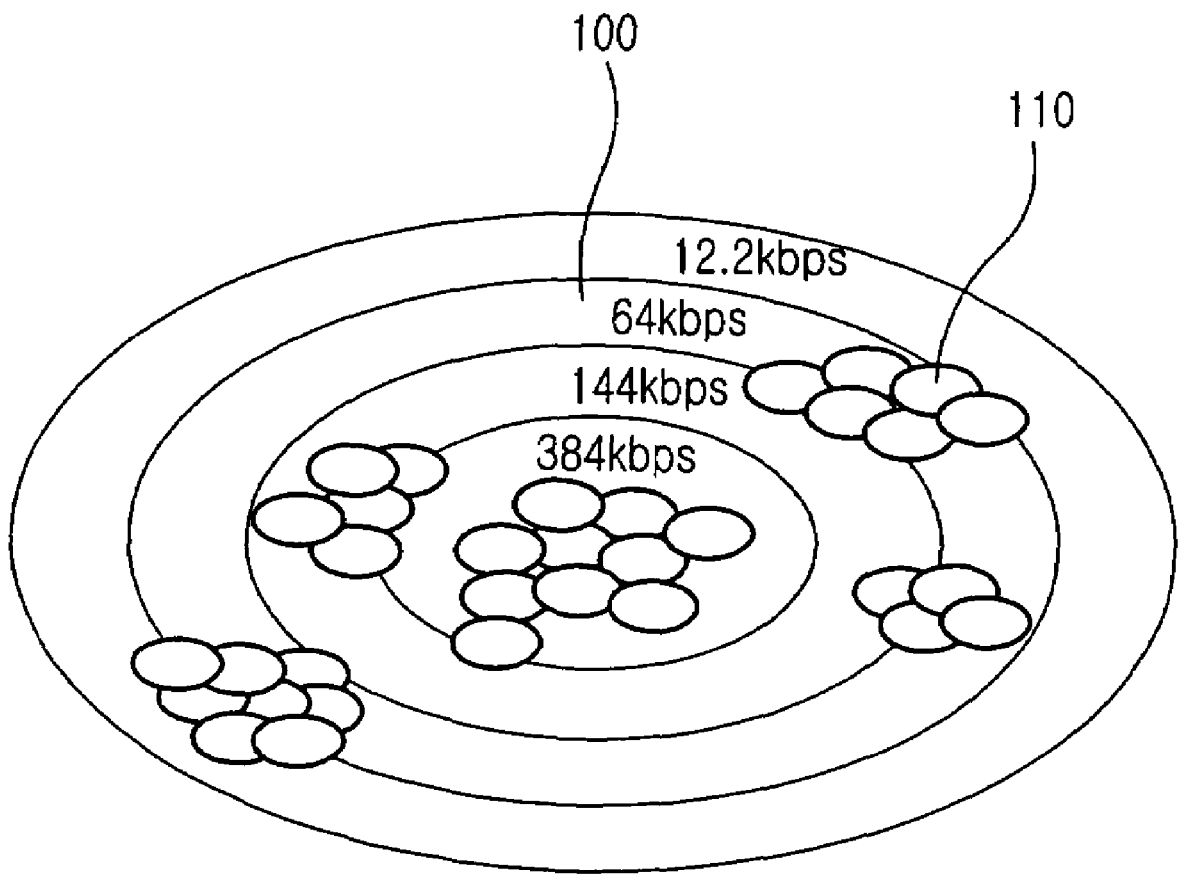
FIG. 1 is a diagram illustrating a carrier-to-interference ratio (C/I)-based service area for a multicast service in a hierarchical cell structure according to an embodiment of the present invention.

An embodiment of the present invention will now be described in detail with reference to the accompanying drawings. In the drawings, the same or similar elements are denoted by the same reference numerals. In the following description, a detailed description of known functions and configurations incorporated herein has been omitted for conciseness.

A major problem for a multicast service relates to handover connections. The embodiment of the present invention can solve the problem associated with frequent-handovers caused by a multicast service used in a microcell, and can also solve an overload problem due to a high-speed multicast service provided in a macrocell. That is, by efficiently providing a multicast service, which must maintain a specific data rate, according to a carrier-to-interference ratio (hereinafter referred to as "C/I") of a macrocell, subscribers within a microcell belonging to the macrocell can use a high-speed service.

Meanwhile, a ratio of average transmission power per Pseudo-random Noise (PN) chip to entire transmission power spectrum density in another area or a physical channel (Ec/Ior) required to satisfy each service data rate specified in Third Generation Partnership Project (3GPP) spec. Technical Specification (TS) 25.101 is illustrated in Table 1 below. Table 1 is based on a dual path pedestrian.

TABLE 1

| Data Rate (Kbps) | BLER (Block Error Rate) | DL Required Ec/Ior |
|---|---|---|
| 12.2 | $10^{-2}$ | −15.0 |
| 64 | $10^{-1}$ | −13.9 |
|  | $10^{-2}$ | −10.0 |
| 144 | $10^{-1}$ | −10.6 |
|  | $10^{-2}$ | −6.8 |
| 384 | $10^{-1}$ | −6.3 |
|  | $10^{-2}$ | −2.2 |

Figure 2:
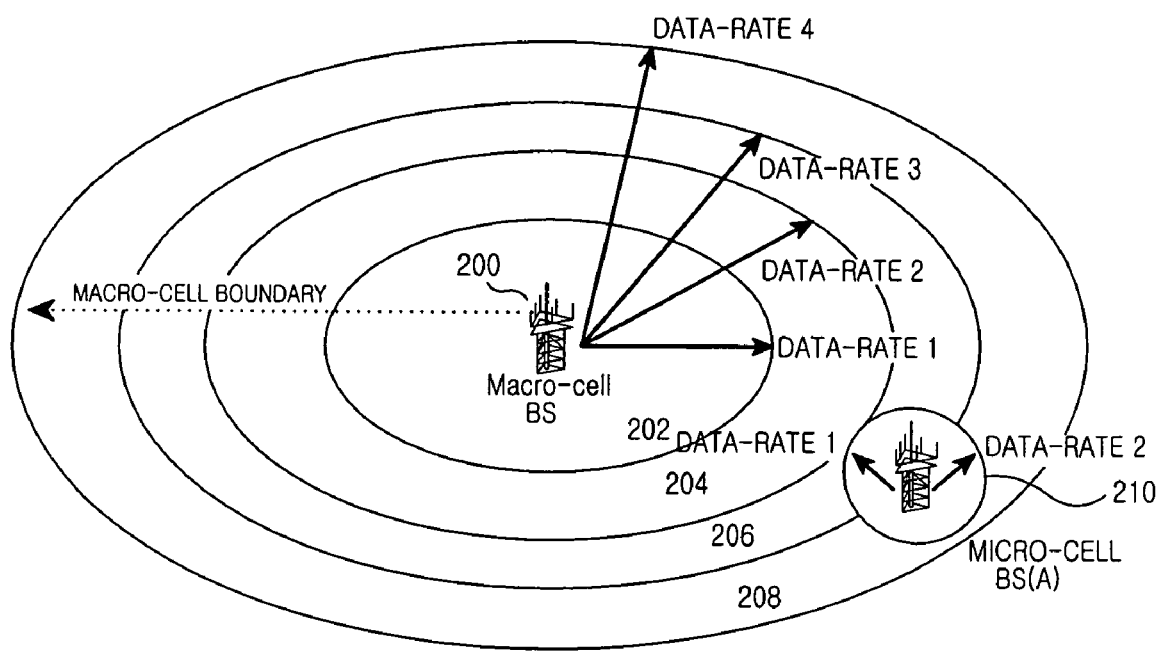
FIG. 2 is a diagram illustrating a concept of providing a multicast service in a hierarchical cell structure according to an embodiment of the present invention.

With reference to FIGS. 1 and 2, a description will now be made of an HCS structure in which a macrocell is divided according to a C/I in accordance with an embodiment of the present invention.

The HCS structure will be described with reference to FIG. 1. The HCS can be designed in such a manner that a plurality of microcells 110 overlap within one macrocell 100. Since a data rate is changed according to a distance from a base station, the data rates of the macrocell in Table 1 can be divided by the area as illustrated in FIG. 1.

That is, the data rates can be divided and arranged according to the distance from the center of the macrocell 100 using a base station. For example, a service can be provided at a high data rate of 384 Kbps at the center of the base station, and since Ec/Ior decreases as the service moves further from the center, the service is provided at a decreasing data rate of 114 Kbps, 64 Kbps and 12.2 Kbps the further a user is from the center.

FIG. 2 is a diagram illustrating a concept of providing a multicast service in a hierarchical cell structure according to an embodiment of the present invention. Referring to FIG. 2, a data rate-based macrocell boundary is divided by the distance, centering on a macrocell base station (BS) 200, and first to fourth data rates are matched to areas 202, 204, 206 and 208, respectively, from the center of the base station to the outside, arranged by the data rate speed from highest to lowest.

A user belonging to a microcell within the macrocell area can receive a multicast service of a specific data rate from either the microcell or the macrocell. Users in a microcell base station 210 can receive a multicast service of the first and second data rates from the microcell, and receive a multicast service of the third and fourth data rates from the macrocell.

Therefore, a mobile station belonging to a macrocell area where the first data rate is supported can receive a service of the first data rate from the macrocell. However, when the mobile station moves to a macrocell area where the third data rate is supported, the mobile station cannot receive a high-speed service of the first data rate from the macrocell, and must receive the high-speed service from a microcell capable of providing a service of the first data rate.

More specifically, an area where a multicast service can be provided according to C/I for a data rate required by a user is set up in the microcell. That is, in a macrocell area exceeding a set radius, a microcell which is in a lower layer provides the multicast service, and in a microcell area within the set radius, a macrocell which is an upper layer basically provides the multicast service.

However, it is also possible to additionally use the existing method of shifting a service layer from a macrocell to a microcell and provide in a microcell a service that was provided in the macrocell. That is, if the number of users requesting a particular multicast service is very small, or if the number of microcells providing a specific multicast service is very small, it is possible to use the existing method of providing a service in a microcell instead of providing a service in a macrocell, even in an area where a service can be provided in the macrocell (i.e., when C/I is satisfied in the macrocell).

A procedure for implementing the above method will now be described with reference to FIGS. 3 and 4.

Figure 3:
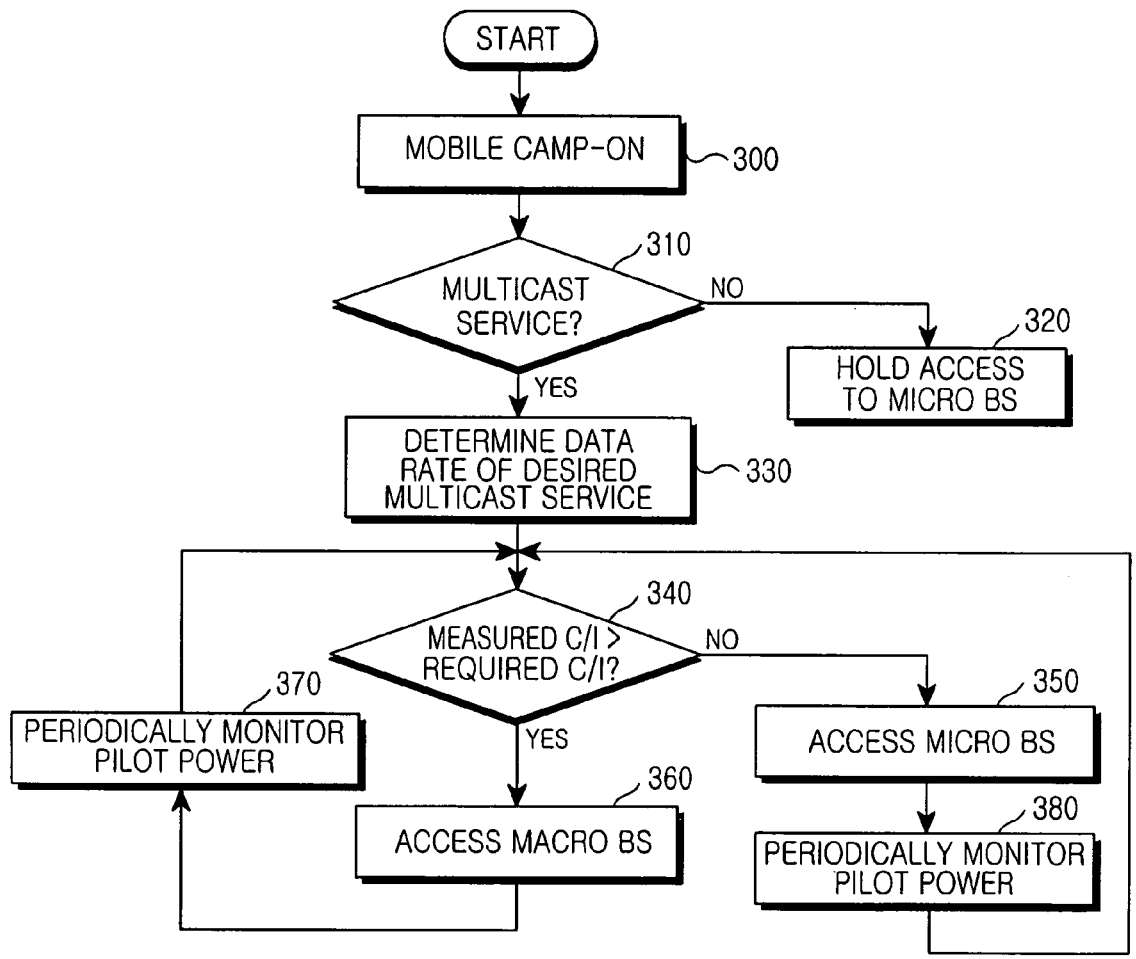
FIG. 3 is a flowchart illustrating a procedure for providing a multicast service in a hierarchical cell structure according to an embodiment of the present invention.

FIG. 3 is a flowchart illustrating a procedure for providing a multicast service in a hierarchical cell structure according to an embodiment of the present invention. Referring to FIG. 3, a mobile station locks on and accesses a given microcell (Step 300), and requests a desired multicast service (Step 310). If the requested service is not a multicast service, the mobile station continues to maintain the access to a base station of the microcell (Step 320).

However, if the requested service is a multicast service, the mobile station determines a data rate of the requested multicast service (Step 330). Thereafter, the mobile station compares C/I for a data rate of the requested multicast service with C/I measured in a macrocell area to which the mobile station belongs, and determines whether it will receive the multicast service from a macrocell or a microcell (Step 340).

If C/I measured in the macrocell is higher than C/I for the requested multicast service, it indicates that the multimedia service can be provided from the macrocell, so the mobile station performs a handover to the macrocell (Step 360).

Therefore, the mobile station receives the multimedia service from the macrocell, and monitors pilot power continuously (preferably at selected periods) during service to check whether the service is provided at an appropriate C/I (Step 370). When an appropriate C/I required for the multimedia service is not guaranteed, it is preferable to perform handover back to the microcell.

However, if C/I measured in the macrocell is lower than C/I for the requested multicast service, the mobile station maintains the access to the microcell (Step 350) to receive a multimedia service since the multimedia service can not be provided from the macrocell. In this case also, the mobile station periodically monitors pilot power to check whether a service is provided at an appropriate C/I (Step 380).

Figure 4:
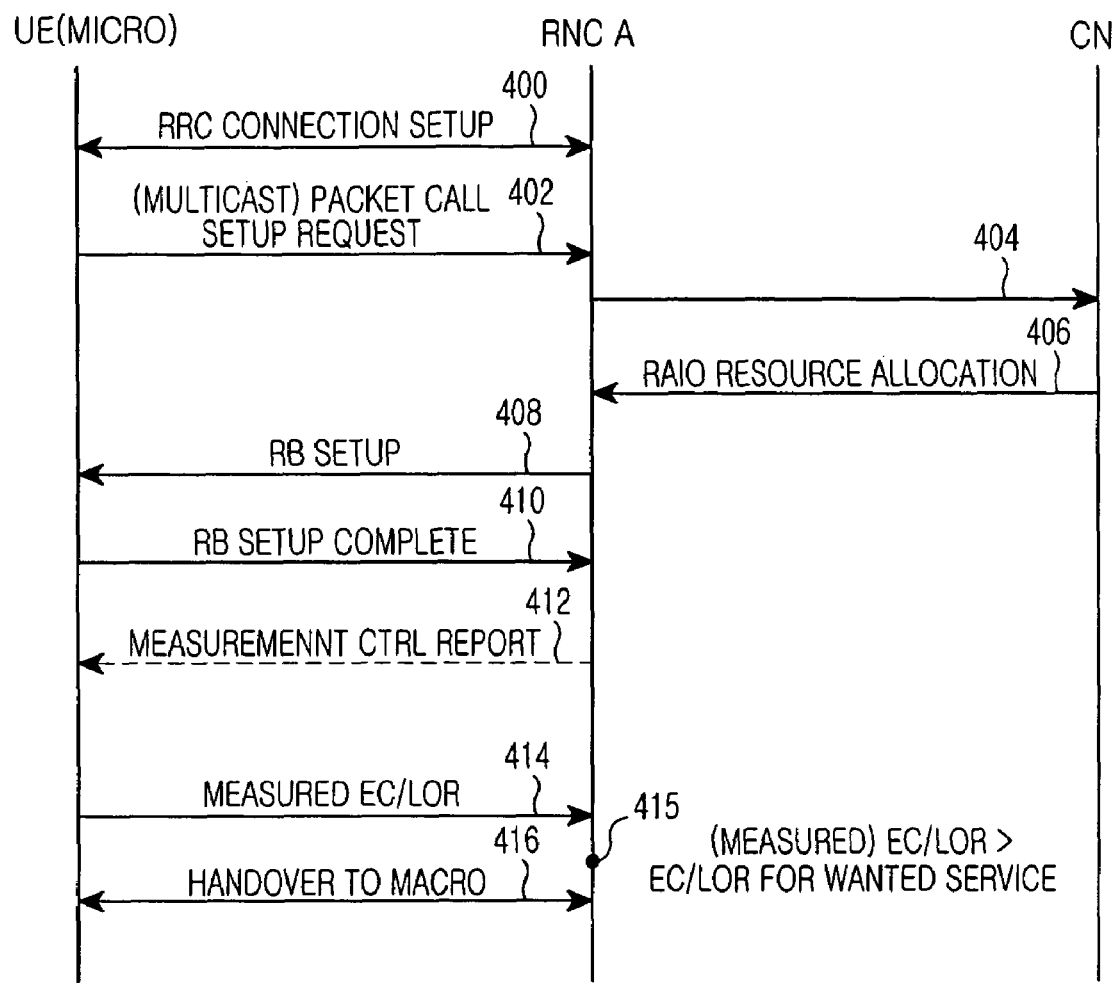
FIG. 4 is a flow diagram illustrating a procedure for managing a multicast service call in a hierarchical layer structure according to an embodiment of the present invention.

FIG. 4 is a flow diagram illustrating a procedure for managing a multicast service call in a hierarchical layer structure according to an embodiment of the present invention. Referring to FIG. 4, a mobile station, or a user equipment (UE), which has entered a given microcell, performs initialization by transmitting a radio resource control (RRC) connection setup request to a base station controller (BSC) A, or a radio network controller (RNC) A, via a base station of the microcell (Step 400), and then transmits a packet call setup request for a multicast service to the RNC A (Step 402).

Upon receiving the packet call setup request, the RNC A transmits the packet call setup request to a core network (CN) (Step 404), and the CN allocates radio resource to the RNC A (Step 406). Thereafter, the RNC A transmits a radio bearer (RB) setup message to the UE (Step 408), and in response, the UE transmits a RB setup complete message to the RNC A (Step 410).

If the UE wants to receive a particular multicast service, the RNC A transmits a measurement control report so that C/I can be measured to determine whether a macrocell is selected by the UE (Step 412). The UE measures C/I in a macrocell area where it is located, and transmits the measured C/I to the RNC A (Step 414). The RNC A compares the measured C/I with C/I required for the multimedia service (Step 415).

If the C/I measured in the macrocell satisfies (or is higher than) the C/I required for the multimedia service, the UE performs a handover to a macrocell base station to which it belongs, and then receives a multicast service from the macrocell.

The foregoing procedure provides an allocation method when there is no other service in operation by the user. In addition, regarding a concurrent call, a layer allocation scheme for providing the concurrent call considers not only C/I but also the following cell selection by the existing call service layer.

(a) When a user who is already receiving another service in a macrocell requests a multicast service that the macrocell provides, the user simultaneously receives an existing service in operation and a multicast service from the same macrocell.

(b) When a user who is already receiving another service in a macrocell requests a multicast service that a microcell provides, a base station hands over a call in service in the macrocell to a microcell to simultaneously service a multicast service and a call in operation in the microcell. Meanwhile, when a multicast service cannot be provided due to lack of capacity of the microcell, the base station determines whether to accept a multicast service according to a load of the macrocell, and increases a specific multicast service area in the macrocell, thereby simultaneously accepting the multicast service and the existing call in the macrocell.

(c) When a user who is already receiving another service in a microcell requests a multicast service that a macrocell provides, the same procedure as the procedure (b) is performed. However, this is possible when the microcell provides the same multicast service.

(d) When a user who is already receiving another service in a microcell requests another multicast service that the microcell provides, if a user performing a call in the microcell requests a multicast service of a high data rate that the microcell provides, the microcell simultaneously provides the existing call and the multicast service.

As can be understood from the foregoing description, it is possible to prevent considerable capacity reduction which may occur due to high-speed data transmission in all areas of the macrocell. Also, it is possible to prevent frequent handovers and a reduction in transmission quality which may occur by providing a multicast service only in a microcell. In addition, compared with a method of dynamically changing a multicast service layer based on the number of microcells providing the multicast service and the number of multicast service users, a method proposed in the embodiment of the present invention can prevent frequent handovers which may occur between layers.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A method for providing a multicast service from a macrocell or a microcell to a mobile station in a mobile communication system having a hierarchical cell structure in which at least one microcell area overlaps one macrocell area, the method comprising the steps of:
    entering, by the mobile station, to the microcell and requesting a multicast service to a base station controller;
    determining, by the base station controller, a data rate of the multicast service requested from the mobile station;
    measuring, by the mobile station, a carrier-to-interference ratio (C/I) in the macrocell where the microcell area overlaps, and transmitting the measured C/I to the base station controller;
    comparing, by the base station controller, the measured C/I with a C/I required based on the determined data rate;
    ordering, by the base station controller, the mobile station to perform a handover from the microcell to the macrocell, if the measured C/I is higher than the required C/I.

2. The method of claim 1, wherein if a service that the mobile station wants to receive is not the multicast service, the mobile station maintains an access to a base station controlling the corresponding microcell or the base station controlling the macrocell.

3. The method of claim 1, wherein even when the measured C/I satisfies the required C/I, the mobile station selectively receives the multicast service from the macrocell and the microcell based on a service state of the microcell to which the mobile station belongs.

4. The method of claim 1, wherein when the measured C/I does not satisfy the required C/I for the multicast service, the mobile station maintains an access to the base station that controls the corresponding microcell.

5. The method of claim 1, wherein when the mobile station receives the multicast service from the macrocell, the mobile station measures the C/I in the macrocell area at selected periods, and determines whether the measured C/I satisfies the required C/I for the multicast service, thereby determining whether to perform a handover to the microcell.

6. The method of claim 1, wherein when an area of the macrocell is divided according to available data rates and the mobile station enters the divided area of the macrocell, the C/I for a data rate of the corresponding area is applied based on whether a multicast service is provided to the mobile station.

7. The method of claim 6, wherein a data rate which becomes a criterion for the area division is one of 384 Kbps, 144 Kbps, 64 Kbps and 12.2 Kbps.

8. The method of claim 6, wherein different data rates are provided based on distance from a center of the macrocell.

9. The method of claim 1, wherein the base station can request a particular mobile station to measure the C/I at a particular time or by periods, and compares the measured C/I with the C/I for a particular service to determine whether to perform a handover.

* * * * *